United States Patent
Letsu-Dake et al.

(10) Patent No.: US 11,077,958 B1
(45) Date of Patent: Aug. 3, 2021

(54) SYSTEMS AND METHODS FOR GENERATING COCKPIT DISPLAYS HAVING USER DEFINED DISPLAY PREFERENCES

(71) Applicant: HONEYWELL INTERNATIONAL INC., Charlotte, NC (US)

(72) Inventors: Emmanuel Letsu-Dake, Shakopee, MN (US); Thea Feyereisen, Hudson, WI (US); Pramod Malviya, Bangalore (IN); Rakshit R, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/062,724

(22) Filed: Oct. 5, 2020

(30) Foreign Application Priority Data

Aug. 12, 2020 (IN) .............................. 202011034644

(51) Int. Cl.
G06F 3/00 (2006.01)
B64D 43/00 (2006.01)
G01C 23/00 (2006.01)
B64D 45/00 (2006.01)

(52) U.S. Cl.
CPC ............. *B64D 43/00* (2013.01); *B64D 45/00* (2013.01); *G01C 23/00* (2013.01)

(58) Field of Classification Search
None
See application file for complete search history.

(56) References Cited

U.S. PATENT DOCUMENTS

| | | | |
|---|---|---|---|
| 6,842,122 B1 | 1/2005 | Langner et al. | |
| 7,191,406 B1* | 3/2007 | Barber | G01C 23/00 701/11 |
| 7,683,771 B1 | 3/2010 | Loeb | |
| 9,523,985 B1* | 12/2016 | Barnes | B64D 43/00 |
| 2012/0075123 A1 | 3/2012 | Keinrath et al. | |
| 2013/0293364 A1 | 11/2013 | Ricci et al. | |
| 2014/0375447 A1* | 12/2014 | Raghunathan | H04L 67/10 340/462 |
| 2015/0239574 A1* | 8/2015 | Ball | B64D 45/00 701/3 |
| 2018/0196428 A1* | 7/2018 | Pilutti | B60K 35/00 |
| 2020/0307823 A1* | 10/2020 | Keberle | B64C 13/042 |
| 2020/0324784 A1* | 10/2020 | Liang | G06K 9/00845 |

* cited by examiner

*Primary Examiner* — Brent Swarthout
(74) *Attorney, Agent, or Firm* — Lorenz & Kopf, LLP (57) ABSTRACT

Methods and systems are provided for generating a user and phase of flight dependent cockpit display. The methods and systems generate a display for a display device using display settings included in a user profile and a current phase of flight. The display settings include preferences defining a range of a map to be displayed that are different for different phases of flight, and preferences defining a level of declutter of a map to be displayed that are different for different phases of flight.

20 Claims, 7 Drawing Sheets

SYSTEMS AND METHODS FOR GENERATING COCKPIT DISPLAYS HAVING USER DEFINED DISPLAY PREFERENCES

CROSS REFERENCE TO RELATED APPLICATION

This application claims priority to Indian Provisional Patent Application No. 202011034644, filed Aug. 12, 2020, the entire content of which is incorporated by reference herein.

TECHNICAL FIELD

The present disclosure generally relates to methods and systems for generating cockpit displays having user defined display preferences. Further, the present disclosure relates to methods and systems for automatically establishing user defined cockpit preferences.

BACKGROUND

A number of preferences of cockpit displays, particularly a navigation display, are pilot/user selectable. Modern navigation displays include a multitude of data layers including radar weather, uplink weather, ground level mapping information, aeronautical information, flight plan information, sensor information and various other possible layers/categories of information. Many layers include a plurality of user selectable display preferences such as whether to display a particular display feature and the form of the display feature. Generally, display settings are selected during flight, which places a time and cognitive burden on the flight crew. The ideal display settings may be phase of flight and crew dependent, which could lead to more changes of display settings throughout a particular flight, which further increases the burden on the flight crew.

Hence, it is desirable to provide systems and methods that allow pilot customization of display preferences having greater automation in setting up and executing the display preferences so as to reduce the workload of the pilot during the flight. Yet further, it would be desirable for pilot customization of display and non-display cockpit features that are semi- or fully automatically executed. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Methods and systems are disclosed herein for generating a user and phase of flight dependent cockpit display. The methods and systems generate a display for a display device using display settings included in a user profile and a current phase of flight. The display settings include preferences defining a range of a map to be displayed that are different for different phases of flight, and preferences defining a level of declutter of a map to be displayed that are different for different phases of flight.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide a user profile adjustable cockpit allowing pilot user experience to be enhanced by semi or automatic execution of pilot preferences for each phase of flight. Cockpit display and other settings may be configured by a pilot prior to take-off. At least some of the settings are set up so as to be different depending upon the phase of flight. An on-board computer system detects when the phase of flight changes and either automatically changes the cockpit settings or issues a prompt to confirm one or more of the cockpit settings that are subject to change. In embodiments, preferences as to a range of a map of a navigation display and/or the form and status of a vertical situation display (VSD) and/or a level of declutter of a map of the navigation display are set up so as to differ between phases of flight. Decluttering of the phase of flight includes removal of entire layers or categories of features of the map and/or removal of sub-features of a given layer or category of features of the map. Numerous examples of layers of map features and sub-features of the layers are described herein. Many other cockpit features may be pilot defined and vary depending on phase of flight, as will be described further herein.

The user profile adjustable cockpit disclosed herein enables pilots to customize, save and call up preferred cockpit settings including navigation and other displays. The cockpit settings may be defined in a user computer such as a tablet computer, a smartphone computer, a laptop, a desktop computer and other computing device. The user computer may be a portable device. The settings defined in the user computer are uploaded to an on-board computer system for implementation of the display and other cockpit settings. A database of user profiles that have been set up in this way may be stored in a cloud computer for access by the user computer and/or the on-board computer system.

In embodiments, the systems described herein provide a capability for airlines to define standard operating procedures (SOP) related cockpit settings and to push fleetwide default settings. For example, airline specific cockpit settings may be included as a default when creating a flight plan, which may be adjusted by a user/pilot. The default cockpit settings may be stored in the cloud databases of user profiles.

In exemplary embodiments described herein, the cockpit, e.g. navigation display, settings and selections are saved in a user profile file. The cockpit settings can be loaded by recalling the profile from the user computer or from the cloud computer. The flight crew can also save settings into a user profile in-flight and subsequently restore their desired preferences for the current or subsequent flights by simply selecting the user profile. Once the user profile is selected and loaded, preferences (such as navigation display preferences) are enabled and executed when phase of flight and/or other flight conditions are met.

Figure 1:
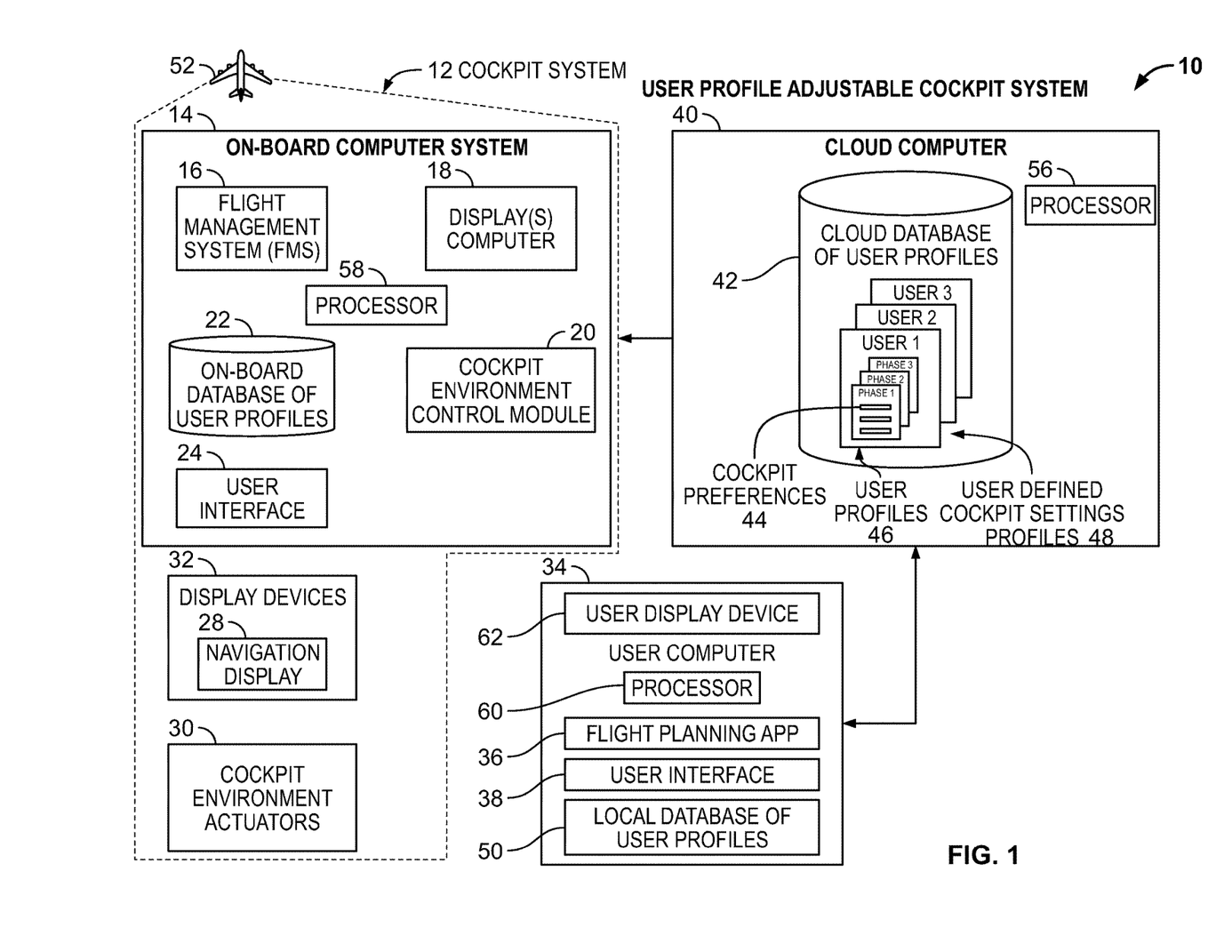
FIG. 1 is a block diagram of a user profile adjustable cockpit system, in accordance with embodiments of the present disclosure.

FIG. 1 is a block diagram of an exemplary user profile adjustable cockpit system 10. The system 10 enables cockpit features to be automatically adjusted (or adjusted after user confirmation) according to preferences set in a user profile file. In a particular example, navigation display settings are adjusted to preferences set in the user profile. At least some of the preferences are phase of flight dependent and adjustments are made depending on a currently detected phase of flight. In accordance with the embodiment of FIG. 1, the system 10 includes a cockpit system 12 located in a cockpit of an aircraft 52. The system 10 includes a cloud computer 40 and a user computer 34.

In embodiments, the aircraft 52 includes a cockpit, one or more engines, and a fuselage. The aircraft 52 can be a multicopter (or rotary-wing), fixed-wing or a tilt-wing aircraft. The aircraft 52 can be an airplane or a helicopter or other aircraft with powered rotors, such as cyclogyros/cyclocopters and tiltrotors. The aircraft 52 may be combustion fuel, fully electric or hybrid powered and can include jet engines or propellers. The aircraft 52 may be a VTOL (Vertical Take-Off and Landing) or eVTOL (electric VTOL).

In the exemplary embodiment of FIG. 1, the cockpit system 12 includes an on-board computer system 14, one or more display devices 32 and cockpit environment actuators 30. The on-board computer system 14 is loaded with at least one user profile that has phase dependent cockpit preferences set by a user. Preferences of the one or more display devices 32 are adjusted based on current phase of flight determined by the on-board computer system 14 and the loaded at least one user profile. In some embodiments, other cockpit environment features are adjusted by the on-board computer system 14, via the cockpit environment actuators 30, based on the loaded user profile and, optionally, based on the phase of flight.

The on-board computer system 14 includes a flight management system 16, a display computer 18, an on-board database of user profiles 22, a user interface 24, and a cockpit environment control module 20. In embodiments, the on-board computer system 14, the cloud computer 40 and the user computer 34 include processors 56, 58, 60 that implement functions of the user profile adjustable cockpit system 10 of FIG. 1 and steps of the methods 200, 300 of FIGS. 6 and 7 according to example embodiments of the present disclosure. The processors 56, 58, 60 can include any suitable processing device, such as a microprocessor, microcontroller, integrated circuit, logic device, or other suitable processing device. One or more memory device(s) are included in the various computers of FIG. 1 and include one or more computer-readable media, including, but not limited to, non-transitory computer-readable media, RAM, ROM, hard drives, flash drives, or other memory devices. The one or more memory device(s) can store information accessible by the processors 56, 58, 60, including one or more computer program(s), which include computer-readable instructions that can be executed by the processors 56, 58, 60. The instructions can be any set of instructions that, when executed by the processor 56, 58, 60, cause the processors 56, 58, 60 to perform operations for providing automated (or semi-automated) cockpit settings adjustments as described herein. The instructions can be software written in any suitable programming language or can be implemented in hardware.

In various embodiments, the FMS 16, in cooperation with a navigation system (not shown) and a navigation database (not shown), provides real-time flight guidance for the aircraft 52. The FMS 16 is configured to compare the instantaneous position and heading of the aircraft 52 with the prescribed flight plan data for the aircraft 52. To this end, in various embodiments, the navigation database supports the FMS 16 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). Accordingly, in various embodiments, the FMS 16 may be a source for the real-time aircraft state data of the aircraft 52. Based on a flight plan entered into the FMS 16 by a pilot through the user interface 24 and/or from an automated application, a computer of the FMS calculates the distances and courses between all waypoints in the entered route. During flight, the FMS provides precise guidance between each pair of waypoints in the route, along with real-time information about aircraft course, groundspeed, distance, estimated time between waypoints, fuel consumed, and fuel/flight time remaining (when equipped with fuel sensor(s)) and other information. Of particular relevance to the present disclosure is that the FMS 16 provides information on a current phase of flight of the aircraft 52 based at least partly on the current location of the aircraft 52 and the flight plan. The phase of flight data provided by the FMS 16 allows the processor 58 to retrieve the appropriate phase of flight dependent cockpit settings from the on-board database of user profiles 22 and to output instructions to adjust display and/or other cockpit environment settings based on the retrieved phase of flight dependent cockpit settings. In additional or alternative embodiments, the phase of flight is determined other than by the FMS 16. In one example, wheel weight sensors can indicate take-off and touchdown, which would allow take-off and arrival flight phases to be determined. An oceanic flight phase could be determined from oceanic images from a camera.

In embodiments, the user interface 24 provides input to one or more system(s) of the aircraft 52. The user interface 24 includes any device suitable to accept input from a user for interaction with the systems of the aircraft 52. For example, the user interface 24 includes one or more of a keyboard, joystick, multi-way rocker switches, mouse, trackball, touch screen, touch pad, data entry keys, a microphone suitable for voice recognition, and/or any other suitable device. The user interface 24 allows a user (e.g. a pilot or other member of the flight crew) to manage loading of a flight plan from the user computer 34 including the user profiles as to cockpit preferences. The user interface 24 may allow a user to enter adjustments to the cockpit settings that have been loaded and to cause saving of the changes. Yet further, the user interface 24 allows a user to respond to one or prompts concerning whether new cockpit settings should be automatically executed when the aircraft 52 is transitioning between phases of flight.

The on-board database of user profiles 22 provides a local storage of one or more user profiles for use by the on-board computer system 14 to determine cockpit settings during different phases of flight. The on-board database of user profiles 22 is stored on memory (not shown) of the on-board computer system 14, which has been described above. The on-board database of user profiles 22 may include user profiles (to be described further below) of the current flight crew. In some embodiments, the on-board database of user profiles 22 is more extensive and includes a record of flight crew members that have previously operated on the aircraft 52 and uploaded a user profile. In some embodiments, the one or more user profiles in the on-board database of user profiles 22 is uploaded from the cloud computer 40 via a global network. In other embodiments, the one or more user profiles in the on-board database of user profiles 22 is uploaded from the user computer 34 via a local network connection (e.g. a WiFi network of the aircraft 52), Near-Field Communication (NFC), Bluetooth, other wireless connection or a cabled connection. In yet further embodiments, the user profile is included in the on-board database of user profiles 22 by a historical upload from a past flight or by direct creation of the user profile via the user interface 24.

The on-board computer system 14 may retrieve a list of user profiles from the cloud computer 40, the on-board database of user profiles 22 or from the user computer 34 for display to the user via the display device 32. The user may select the user profile to be used for the current flight via the user interface 24. The user may need to enter a password or code in order to load the user profile. In other embodiments, the selection of the user profile is made automatically when a user is identified by the on-board computer system 14 by facial recognition technology, by detection of an electronic device of the user (e.g. an electronic flight bag (EFB) device), by the user logging in to the on-board computer system 14, etc.

The display computer 18 receives data concerning the phase of flight from the FMS 16 (or other source) and also receives a selected user profile from the on-board database of user profiles 22. The user profile has at least some display settings that are phase of flight dependent. The currently applicable display settings are extracted from the user profile based on the current phase of flight and the display computer 18 adjusts the currently executed display settings based on the extracted display settings. The display computer 18 may invoke a display settings update process continuously, intermittently or only when a change of phase of flight is detected. Various display settings may be defined in the user profile and adjusted by the display computer 18 in dependence on phase of flight, as will be described more fully below. In examples, the display settings include preferences as to defining a range of a map to be displayed that are different for different phases of flight and preferences defining a level of declutter of a map to be displayed that are different for different phases of flight. The display computer 18 generates various types of displays (e.g. PFD, navigation display, vertical display, etc) using the updated display settings and outputs the displays to the display devices 32 for presentation to the user. The cockpit environment control module 20 receives the user profile from the on-board database of user profiles 22 and optionally the phase of flight data from the FMS 16 or other source when there is flight dependency on the non-display based cockpit settings. The cockpit environment control module 20 outputs instructions to the cockpit environment actuators 30 for adjusting cockpit features. In one example, cockpit lighting may be changed through lighting control actuators included in the cockpit environment actuators 30. Cockpit lighting may be phase of flight dependent. In other examples, seat distance relative to an instrument panel, seat height, seat angle and/or other seat features may be adjusted by seat motors included in cockpit environment actuators 30.

The processor 58 is described in greater detail above. The processor 58 is shown as a separate component from the display computer 18, the cockpit environment control module 20 and the FMS 16 for conceptual reasons. Separate processors may be included in each of the flight management system 16, the display computer 18 and the cockpit environment control module 20 or a central processor 58 may be provided as shown. Further, although the display computer 18 and the cockpit environment control module 20 are illustrated as being separate features of the on-board computer system 14, they may be integrated together into a single computer or module.

In embodiments, the display device 32 (or plural display devices 32) includes a head down display (HDD), a head up display (HUD), a wearable HUD, a portable display or any combination thereof. The display device 32 may be a VSD, a navigation display, a PFD or any combination thereof. The display device 32 receives display data generated by the display computer 18, which has been generated based on the currently active display settings. Of particular relevance to the present disclosure is a navigation display 28 including a lateral navigation view including a range ring (described further below) and a map and a VSD that can be of various aspect ratios and size formats. The display computer 18 generates displays that change depending on the phase of flight and according to the display settings in the user profile including an adjusted range for the range ring and corresponding scale of the map in the lateral view, adjusted declutter of the map and adjusted aspect ratio and/or size of the VSD and/or whether the VSD is displayed.

The cockpit environment actuators 30 can be any suitable electrical, pneumatic, hydraulic and/or spring actuators including servomotors, binary switches and variable switches. The type of actuator used will depend on the cockpit feature being controlled. Non-display cockpit features for control by the cockpit environment actuators 30 are described further below.

The user computer 34 can be any of a variety of electronic devices including a smartphone, a tablet, a laptop, a desktop computer and the like. The user computer 34 is, in embodiments, a portable EFB device allowing a user to set up cockpit preferences that are, at least partly, phase of flight dependent. The user may set up the cockpit preferences offboard, e.g. prior to a flight and, in many cases, remote from the aircraft 52. The user computer 34 includes one or more processors 60, a flight planning app 36, a user interface 38, a user display device 62 and a local database of user profiles 50. The processor 60 has been described in more detail above. The flight planning app 36 is a computer application including computer program instructions for execution by the processor 60. The flight planning app 36 allows a user to plan various aspects of a scheduled flight (such as the route), which are outside the scope of the present disclosure. Of particular relevance to the present disclosure is that the flight planning app 36 controls creation, editing and saving of user profiles. Various exemplary display interfaces generated by the flight planning app 36 will be described below with respect to FIGS. 2 to 5. The user interface 38 provides a device allowing user entry of cockpit settings. The user interface 38 can be any one of conventional devices including a keyboard (virtual or physical), a mouse, a trackball, a touchscreen, a touchpad, etc. The user display device 62 is provided to allow display of presentation of a user profile and adjustable cockpit settings associated therewith. The user can interact with the presentations, via the user interface 38, to create, edit, delete and save user profiles.

Once user profiles have been created or edited, they may be saved in the local database of user profiles 50. The flight planning app 36 controls an interface with the on-board computer system 14 so that a user profile can be transferred to the on-board computer system 14 in response to a request from the on-board computer system 14 or in response to a request based on a user selection via at least one of the user interfaces 24, 38. The flight planning app 36 controls an interface with the cloud computer 40 so that the user can access user profiles stored in a cloud database of user profiles 42 and upload local user profiles to the cloud database of user profiles 42. The flight planning app 36 thus allows a user to create new profiles to be saved in one or more of the local database of user profiles 50 and the cloud database of user profiles 42, load existing user profiles from one or more of the local database of user profiles 50 and the cloud database of user profiles 42, edit existing user profiles that have been loaded and save the edited user profiles to the local database of user profiles 50 and the cloud database of user profiles 42. Although the flight planning app 36 is described with respect to the user computer 34, it is envisaged that the same app, or the same functionality in another app, could additionally or alternatively be provided on the onboard computer system 14.

The flight planning app 36 may provide access to a default user profile, which is stored on the local database of user profiles 50 or on the cloud database of user profiles 42. The default user profile may be determined based on an airline carrier for the flight plan being created by the user. Each airline carrier may have preferred cockpit settings that are phase of flight dependent. The pilot may adjust the default settings through the user interface 38. In addition to basing the user profile on a default user profile, the flight planning app 36 may also allow the user to load other user's profiles (when access is allowed) as a basis for the current user. The flight planning app 36 may also allow the user to delete their own profiles and optionally any profiles over which the user has administration rights. A user may have more than one user profile. For example, a user may wish to create different user profiles for different flights so that user profiles suited to particular types of flights (e.g. over ocean, short haul, long haul, etc.) can be saved and conveniently loaded. The flight planning app 36 may further control access rights to user profiles stored on the local database of user profiles 50 and/or the cloud database of user profiles 42. User profiles may have different access rights for other users including not accessible, viewable, viewable and loadable and/or viewable, loadable and editable. These access rights may be user dependent and the user account is controlled through a user authentication process including password, pin, code sent to a personal device from a central management server, facial recognition, fingerprint recognition, etc. Similar user authentications may be required to allow editing of a user's profile.

With additional reference to the exemplary user profile adjustable cockpit system 10 of FIG. 1, the cloud computer 40 includes the cloud database of user profiles 42 and the processor 56. The processor 56, and associated hardware such as network interfaces and data storage (not shown), provides for data management for storing, retrieving and transferring data from the cloud database of user profiles 42 to remote devices including the user computer 34 and the on-board computer system 14. Data communications between the cloud computer 40, the user computer 34 and the on-board computer system 14 are over a secured network communication such as a secured internet communication. The cloud database of user profiles 42 includes records of user profiles 46 that each include a plurality of user defined cockpit settings profiles 48 for respective phases of flight. In one exemplary data structure, each user profile includes a first user defined cockpit settings profile 48 defining cockpit preferences 44 for a first phase of flight (e.g. on ground), a second user defined cockpit settings profile 48 defining cockpit preferences 44 for a second phase of flight (e.g. departure), etc. Other data structures are possible provided that differing display preferences are stored in each user profile for different phases of flight. It should be appreciated that only one or some of the cockpit (display) preferences 44 may differ between two or more phases of flight. Further, there may be more than two phases of flight and at least one of the cockpit (display) preferences 44 may differ for a subset (e.g. two or more phases of flight) of the total number of phases of flight that have been defined in the user profile 46 whilst display preferences 44 for a different subset (e.g. two or more phases of flight) of the total number of phases of flight are the same.

In some embodiments, there may be the central cloud database of user profiles 42 on the cloud computer 40 and the user computer 34 and/or the on-board computer system may be dumb terminals that merely access the central cloud database of user profiles 42 without locally storing any significant part of the database. In other embodiments, the user computer 34 stores the local database of user profiles 50, which is periodically synchronized with parts of the cloud database of user profiles 42 that are relevant to the user ID of the user computer 34. The on-board computer system 14 may only synchronize database records that are relevant to the current flight plan for storage on the on-board database of user profiles 22. The data synchronization for the on-board database of user profiles 22 is, in one embodiment, with the user computer 34 and, in other embodiments, is with the cloud computer 40.

Figure 2:
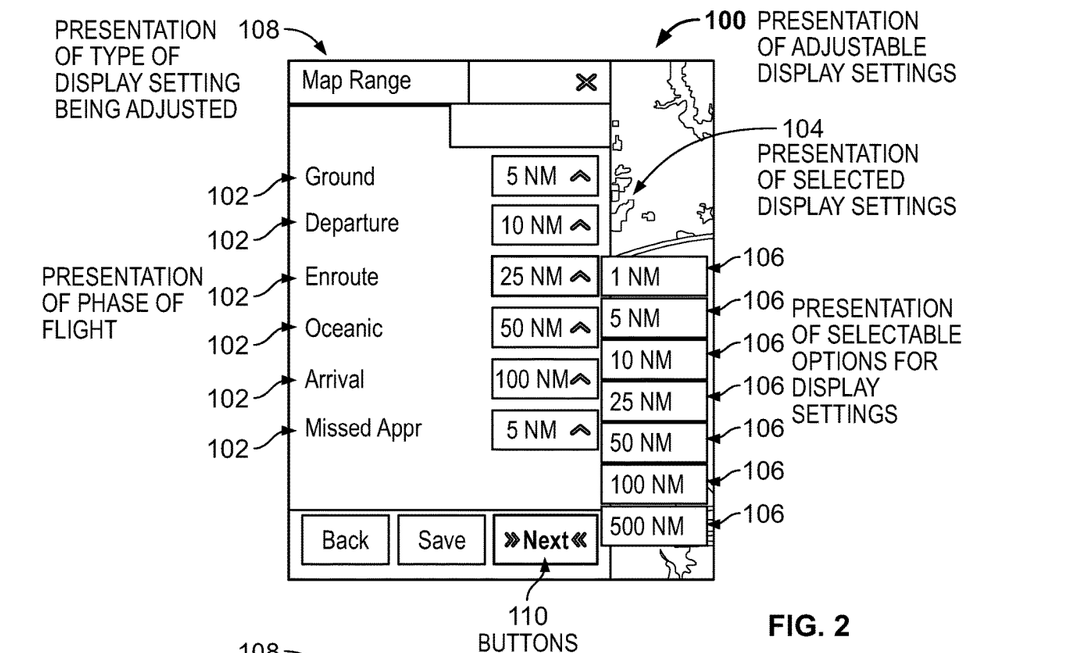
FIG. 2 is an exemplary user interface showing user selected map range settings for different phases of flight, in accordance with embodiments of the present disclosure.

FIG. 2 shows an exemplary presentation of adjustable display settings 100. The presentation of adjustable display settings 100 may be displayed on the display device 32 of the cockpit system 12 under control of the display computer 18 (and an optional flight planning app). Additionally or alternatively, the presentation of adjustable display settings 100 may be displayed on the user display device 62 of the user computer 34 under the control of the flight planning app 36. The presentation of adjustable display settings 100 includes presentations of various elements including phases of flight 102, selected display settings 104, options for display settings 106, type of display setting being adjusted 108, selectable options for the display settings and buttons 110. In the example of FIG. 2, the presentation of the type of display setting being adjusted 108 indicates map range. The presentation of phases of flight 102 includes ground, departure, enroute, oceanic, arrival and missed approach. However, any subset of two or more of these or other phases of flight may be provided such as simply in-air and on-ground. The presentation of selected display settings 104 indicates the currently selected map range during each phase of flight. In the example provided, the user has selected a map range of 5 nautical miles (NM) for ground, 10 NM for departure, 25 NM for enroute, 50 NM for oceanic, 100 NM for arrival and 5 NM for missed approach. These map ranges may be adjusted for each phase of flight for the user through the user interface 38. In the exemplary embodiment, the user is provided with the presentation of selectable map ranges for display settings 106, which includes various common values for the user entry including 1 NM, 5 NM, 10 NM, 25 NM, 50 NM, 100 NM and 500 NM. More or less of these options may be selectable and other selectable map ranges may be presented. In other embodiments, a particular value may be entered by the user through a virtual numeric keypad or other way of entering a custom value through the user interface 38 or the user interface 24 rather than selecting from a list of options. The buttons 110 allow the user to save the selected display settings for the map range. These display settings for each phase of flight will be saved under a user profile 46 in the cloud database of user profiles 42, the on-board database of user profiles 22, the local database of user profiles 50 or any combination thereof. The buttons 110 may also include back and next buttons, which can be selected to allow a user to move between different adjustable display settings such as map range as exemplified in FIG. 2, VSD state as exemplified in FIG. 3 and/or level of declutter. Examples of display settings that can be user defined and that may differ depending on phase of flight are described further below.

Figure 3:
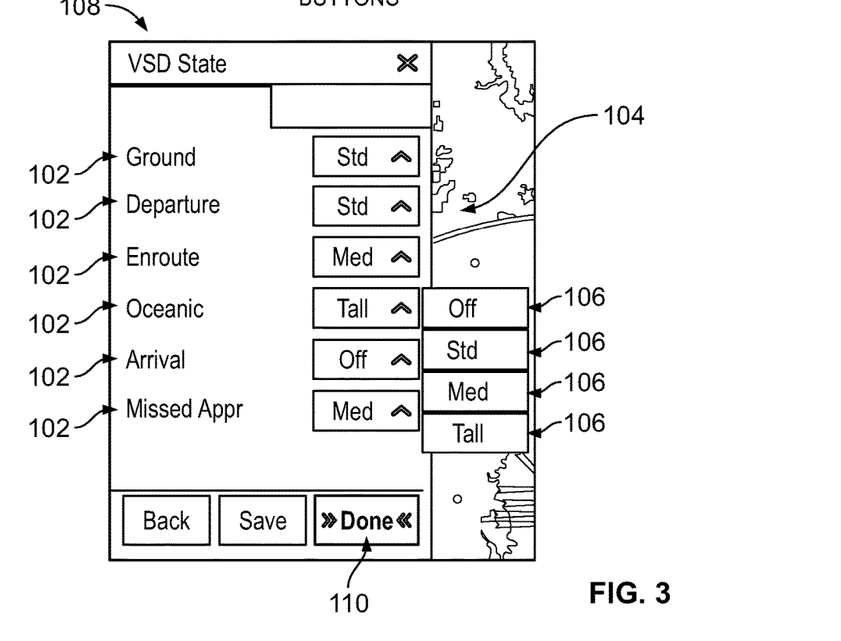
FIG. 3 is an exemplary user interface showing user selected vertical situation display format for different phases of flight, in accordance with embodiments of the present disclosure.

FIG. 3 shows another exemplary presentation of adjustable display settings 100 in which the presentation of the type of display setting being adjusted 108 indicates a VSD state. Accordingly, whilst the presentation of FIG. 2 prompts a user to define map range display settings, the presentation of FIG. 3 prompts the user to define VSD state display settings. The presentation of selectable options for the VSD state display settings include off, standard, medium and tall. In this way, the presence of the VSD, the size and/or the aspect ratio of the VSD can be adjusted for each phase of flight. In the exemplary embodiment of FIG. 3, the following VSD state display settings have been selected by the user through the user interface 38 or the user interface 24: standard for ground and departure phases of flight, medium for enroute and missed approach phases of flight, tall for oceanic phase of flight and off for arrival phase of flight. It should be appreciated that less or more or different phases of flight may be included and less or more or different VSD states may be included.

Figures 4A, 4B:
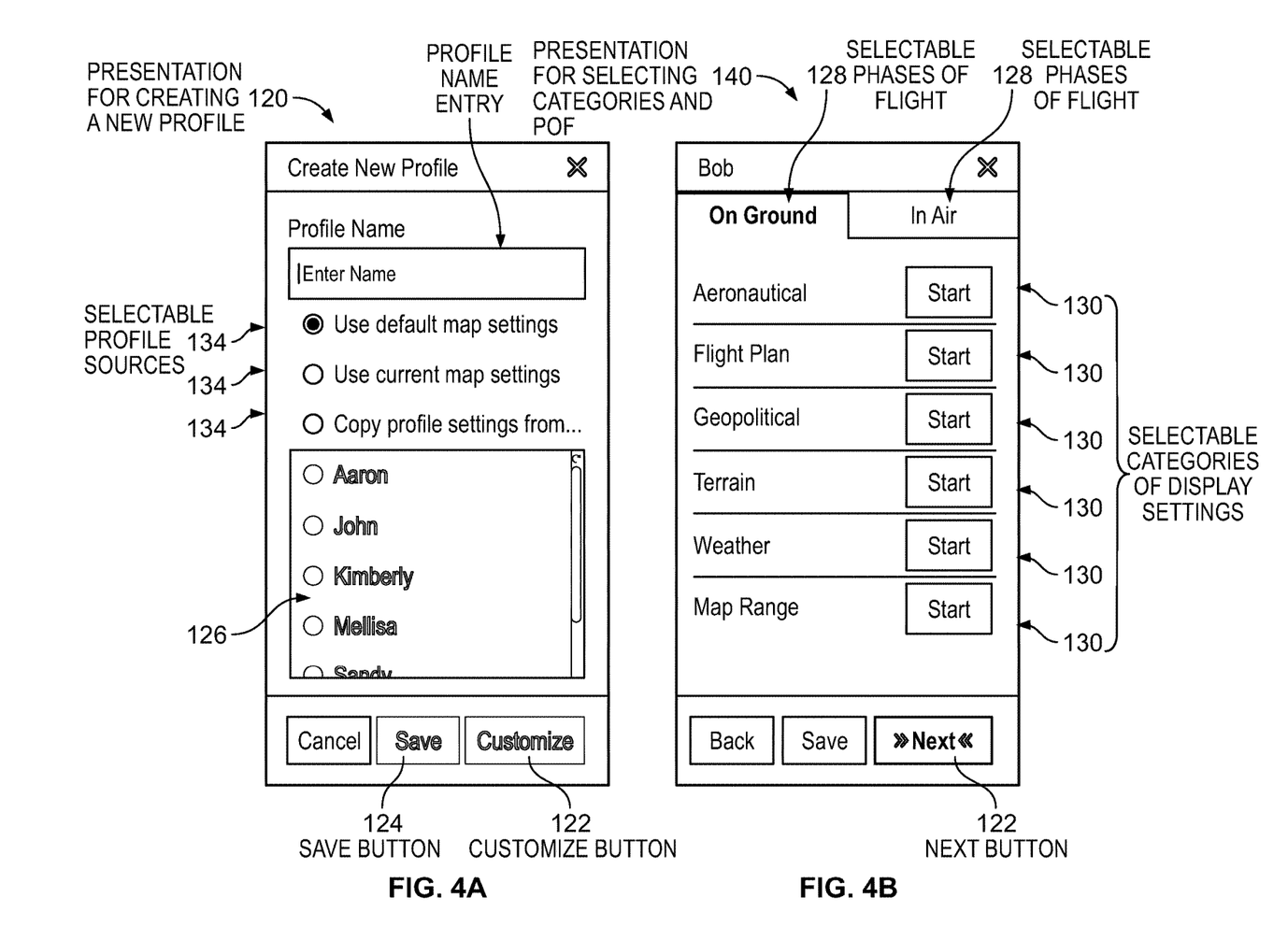
FIG. 4A is a user interface for user profile creation, in accordance with embodiments of the present disclosure.
FIG. 4B is a user interface for phase of flight selection and category of display settings selection, in accordance with embodiments of the present disclosure.
Figure 4C:
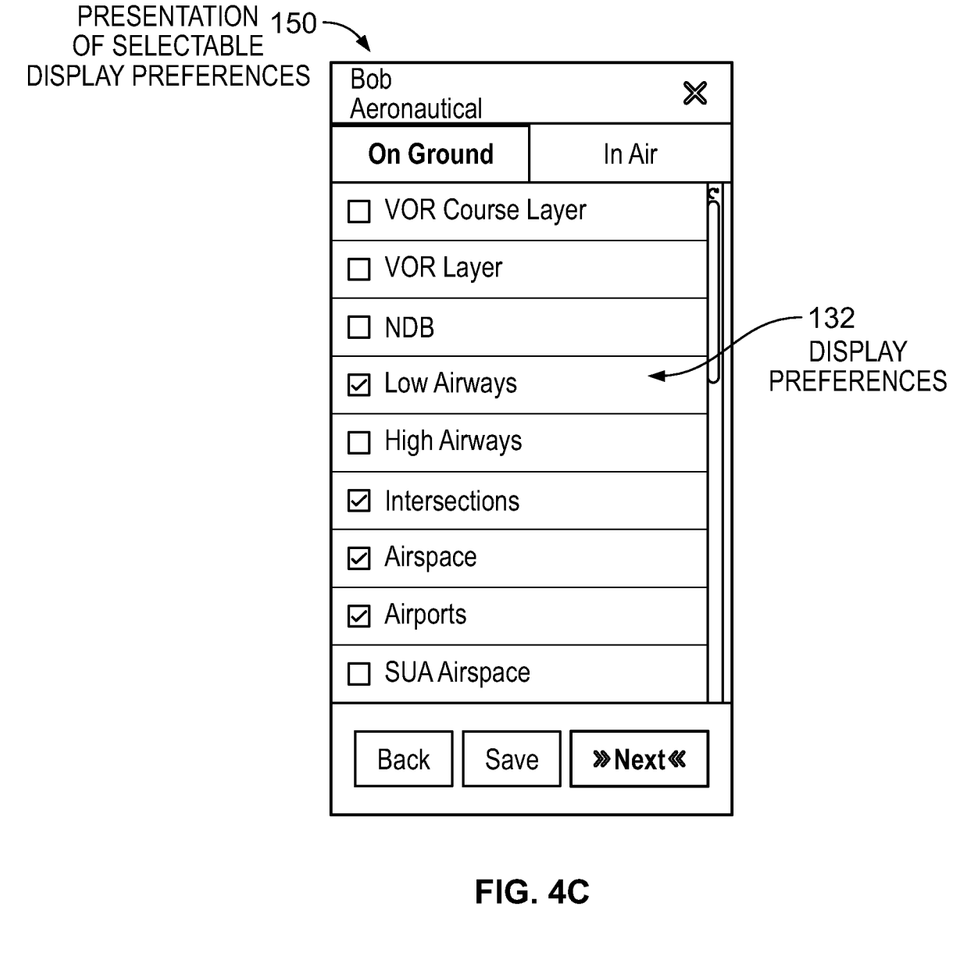
FIG. 4C is a user interface for selecting display features for a particular category of display settings, in accordance with embodiments of the present disclosure.

FIGS. 4A to 4C illustrate an exemplary sequence of presentations 120, 140, 150 for creating a user profile to be stored in one or more of the databases of user profiles 22, 42, 50. The presentations 120, 140, 150 of FIGS. 4A to 4C may be displayed on the display device 32 of the cockpit system 12 or the user display device 62 of the user computer 34. The user profile may be created or saved with respect to a particular flight plan for loading to the on-board computer system 14 during execution of that flight plan. FIG. 4A shows a presentation for creating a new profile 120 including a field (a data entry box in the exemplary embodiment) where a user entry of a profile name or profile ID can be input using at least one of the user interfaces 24, 38. The presentation for creating a new profile 120 includes a customize button 122 whereby an entirely new profile process can be initiated. The presentation for creating a new profile 120 includes selectable profile sources 134 from which a user profile can be adapted from, or copied from, an already existing user profile. In one option, the selectable profile sources 134 include a default user profile, which may be airline carrier specific. In another option, the selectable profile sources 134 includes a current user profile option. The current user profile may allow saving of current cockpit settings (e.g. in-flight or at the end of flight) for one or more phases of flight through the user interface 24 of the cockpit system 12 or through the user interface 38 of the user computer 34 when tethered to the on-board computer system 14. In another option, the user profile may be copied from a pre-existing user profile retrieved from at least one of the databases of user profiles 22, 42, 50. For example, flight crew members in a network of flight crew members may be able to load and copy each other's user profiles. The network may be based on flight crew for a particular airline carrier, a social network, and the like. The save button 124 may be selected in order to save the user profile to at least one of the databases of user profiles 22, 42, 50.

FIG. 4B shows a presentation for selecting categories and phases of flight 140 for user defined cockpit settings assuming that the customize button 122 has been selected. A plurality of selectable phases of flight 128 and a plurality of selectable categories of display settings 130 can be selected through one of the user interfaces 24, 38. The selectable phases of flight include on-ground and in-air in the example embodiment, but more or different selectable phases of flight may be provided. Further, display preferences are divided into the following categories in the exemplary embodiment: aeronautical, flight plan, geopolitical, terrain, weather and map range. Any subset of two or more of these categories may be provided and more, less or different categories may be provided. The presentation for selecting categories and phases of flight 140 of FIG. 4B allows a user to select a combination of phase of flight and category of display preferences for entry of display preferences in the subsequent screen of FIG. 4C. In FIG. 4C, the user has selected on ground and aeronautical, which results in a presentation of selectable aeronautical display preferences 150. In the exemplary embodiment, the following display preferences (e.g. display widgets or layers to be displayed) can be toggled on or off: VOR course layer, VOR layer, Non-direction beacon (NDB), low airways, high airways, intersections, airspace, airports, Special Use Airspace (SUA), etc.

It should be appreciated that the categorization of display preferences of FIG. 4B is not necessary. This feature is provided to conceptually sort the data and make it easier to manage for a user when there are a large number of display preferences that can be user defined. By selecting which layers of data to display on a navigation map as shown in FIGS. 4A to 4C, a level of declutter of the navigation map can be user defined. The level of declutter can be user defined to differ for different phases of flight. In FIG. 4C, each layer of display data is able to be toggled by a user. In other embodiments, the user may be presented with selectable levels of navigation map declutter without a detailed breakdown of each layer of display feature. For example, the user may be presented with options of: declutter level 1 (declutter land data), declutter level 2 (declutter land and SUA data) and declutter level 3 (declutters large NAV data remaining). These declutter levels progressively remove layers of display features and thus are ordered from low declutter (with less display layers removed) to high declutter (with more display layers removed). Other numbers of levels of declutter could be provided than three including two or four or more.

Figure 5:
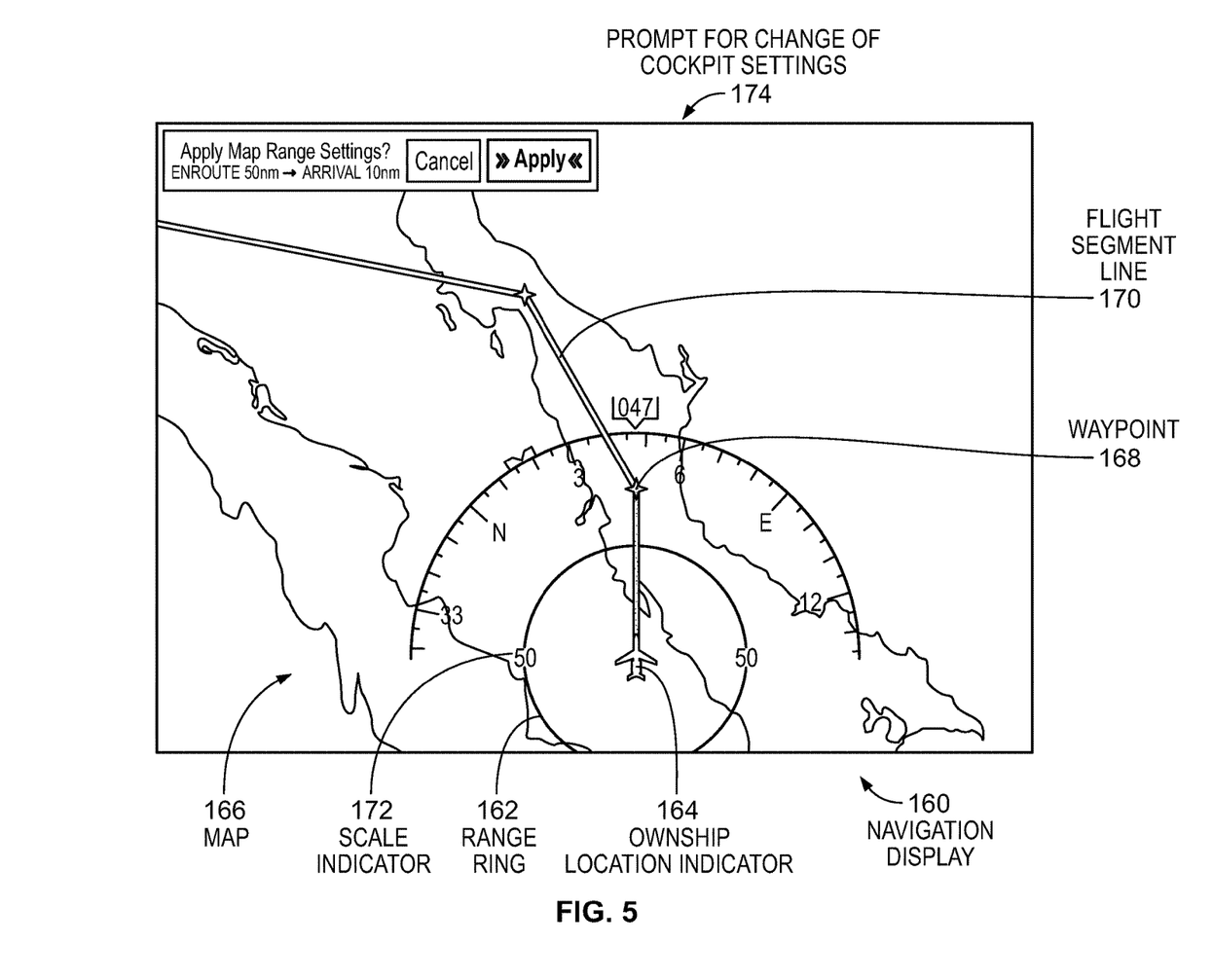
FIG. 5 is a navigation display showing a user prompt for executing a change of display settings when a phase of flight is changed.

FIG. 5 illustrates an exemplary navigation display during a flight. The on-board computer system 14 is executing the features and processes described herein whereby cockpit settings, particularly display settings, based on one or more user profiles from the on-board database of user profiles 22 are being executed by the display computer 18 and/or the cockpit environmental control module 20. At least one of the display settings is phase of flight dependent such that when the phase of flight is detected to change by the on-board computer system 14, the at least one display setting is correspondingly adjusted. In the example of FIG. 5, the navigation display 160 (which is a lateral presentation) presents a map 166, an ownship location indicator 164, a range ring 162 (or partial range ring) disposed about the ownship location indicator 164 to indicate the scale of the map 166 and waypoints 168 connected by flight segment lines 170. In the example of FIG. 5, the aircraft 52 is traversing a transition between an enroute phase of flight and an arrival phase of flight as detected by the FMS 16. According to the user profile, the map range should change from 50 NM to 10 NM when changing from the enroute phase of flight to the arrival phase of flight. The scale of the map may automatically or semi-automatically change when the phase of flight changes. Further, the scale indicator 172 will change from 50 to 10, whilst the range ring 162 may stay the same size. In a semi-automatic embodiment, a prompt for change of cockpit settings 174 is displayed asking the user to confirm or cancel a cockpit setting change prescribed by the user profile. In the example of FIG. 5, the prompt 174 asks whether the map range should be changed from 50 NM to 10 NM in accordance with the map range settings in the user profile. The user responds to apply or cancel the change through user interface 24. In other embodiments, the change in cockpit settings is implemented automatically without first prompting for confirmation by the user. In other embodiments, some cockpit settings changes may be implemented automatically and some implemented semi-automatically. In other embodiments, all cockpit settings changes are semi-automatically implemented using a single prompt and in other embodiments individual prompts are provided for each change in individual or grouped settings. Whether to implement the changes automatically or semi-automatically may also be a user definable parameter for all settings changes, for individual settings changes or for grouped settings changes.

In the following, a non-limiting list of cockpit display settings that may be adjustable is provided. Any one or any combination of these cockpit display settings may be defined in a user profile and may or may not be phase of flight dependent. One example cockpit display setting is the Vertical Profile (VSD) status, which may be defined as any one or more of: on/off, standard size, medium size or expanded size in order of size or different aspect ratios may be defined such as horizontal or vertical (e.g. broad or tall). Another example is lateral map mode, which may be defined as north up, heading up or track up. A further example is to center to aircraft or center to waypoint. These cockpit display settings may be grouped or categorized under navigation settings.

In further examples, the following map layers (or any one or combination thereof) may be toggled on/off in order to change a level of declutter and may be defined differently with respect to different phases of flight: terrain, traffic, flight plan, fixes (or waypoints), airways, airspaces and boundaries.

In yet further examples, the following type, amount and/or source of weather data to be displayed on the map may be toggled on/off. In terms of weather data sources any one or combination of the following weather data sources may be defined to be displayed or not displayed depending on the phase of flight: significant weather data, satellite weather data, radar weather data, uplinked weather data and nexrad. The user profile may also define types of weather data in detail including the ability to toggle on or off the following weather data features (or any one or combination thereof): lightning, turbulence, turbulence (VSD), icing, icing (VSD), storm tops, satellite, winds, Clear Air Turbulence (CAT), echo tops, Temporary Flight Restriction (TFR), Airman's Meteorological information (AIRMET), AIREP, PIREP, Significant Meteorological Information (SIGMET), freezing, METAR, Terminal Aerodrome Forecast (TAF), satellite and RADAR. By changing whether to display weather data from different sources and/or different types (features) of weather data, a level of declutter of the navigation map is changed depending on phase of flight. These display features may be categorized as weather.

In yet further examples, the following map layers (or one or any combination thereof) may be toggled on or off and may be user defined in a phase of flight dependent way: boundaries layer, cities layer, major roadways layer, minor roadways layer and railways layer. By adjusting which, if any, of these layers are displayed and defining the number of layers differently for different phases of flight, a level of declutter of the map display can be changed. These display layers may be categorized as geopolitical.

In other examples, the following map layers (or any one or combination thereof) may be toggled on or off depending on phase of flight and user definition in the user profile: VOR Course layer, VOR layer, Non-Directional Beacon (NDB) layer, airways HI ALT layer, airways LOW ALT layer, intersection layer, terminal airspace layer, airports layer, and SUA Airspace layer. By changing which of these layers are displayed, if any, a level of declutter of the map is adjusted. These layers may be categorized as aeronautical layers.

In examples, the following map layers (or any one or combination thereof) may be switched on or off according to the user profile and phase of flight: an airborne traffic layer such as Traffic Collision Avoidance System (TCAS) and/or Automatic Dependent Surveillance Broadcast (ADS-B In), uplink weather layer, airborne weather layer, Situational Awareness (SA) terrain layer, threat terrain layer, Lightening Storm Scope (LSS) layer. These are examples of decluttering by turning on or off display features for the category of sensor layers.

In yet further examples, the user profile may include phase dependent user defined display preferences including lateral map range, whether to display surface alert indications, whether to display a taxi path and/or a mode of the VSD including flight plan (FPLN) or tracking (TRK).

In further examples, non-display cockpit settings may also be defined in the user profile, which may or may not be phase of flight dependent. Such cockpit settings include (one or any combination of): cockpit display window configuration, environmental settings e.g. temperature, lighting, seat adjustments, input mode preference e.g. voice, touch, gesture, camera for the user interface 24, automation mode selections, active/enabled applications and functions, and authentication preferences.

Figure 6:
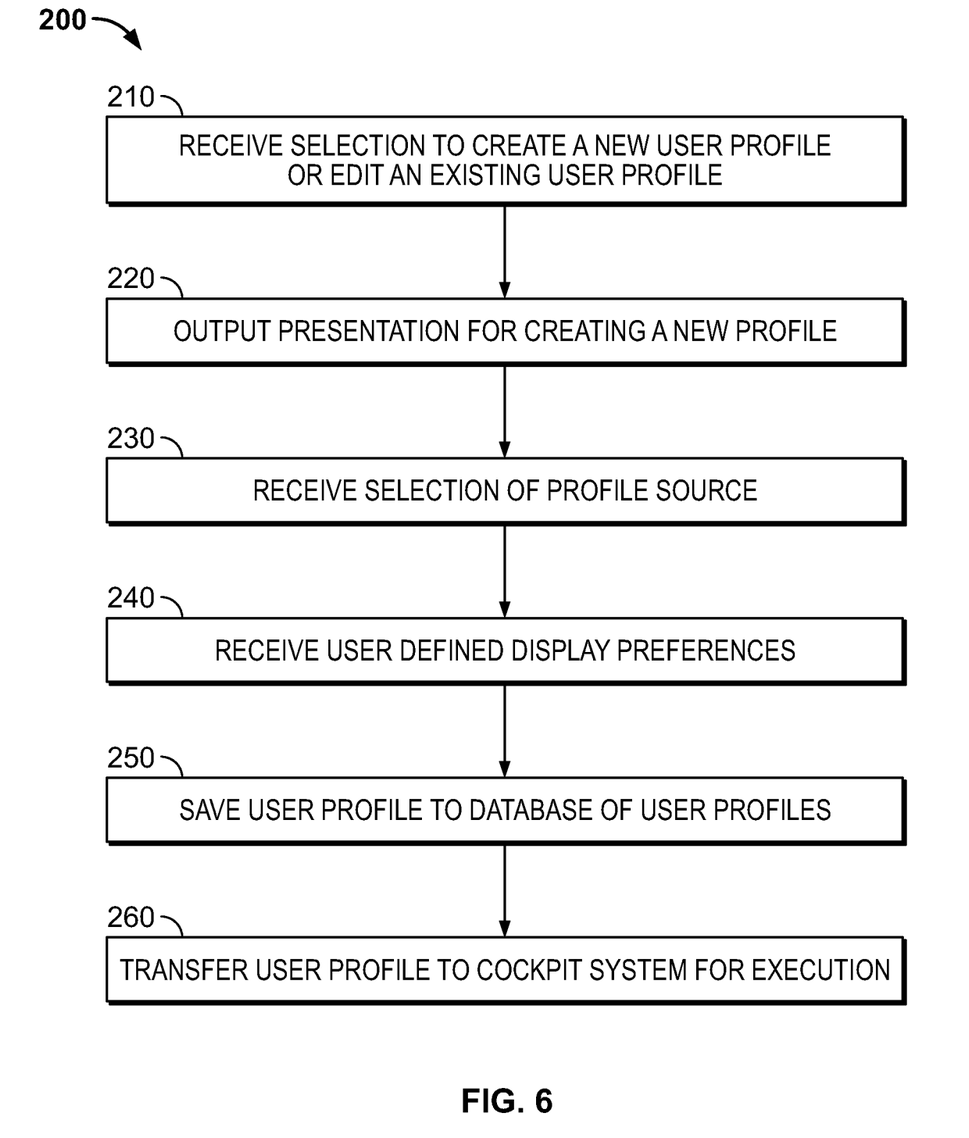
FIG. 6 is a flow chart of a method of creating a user profile, in accordance with embodiments of the present disclosure.
Figure 7:
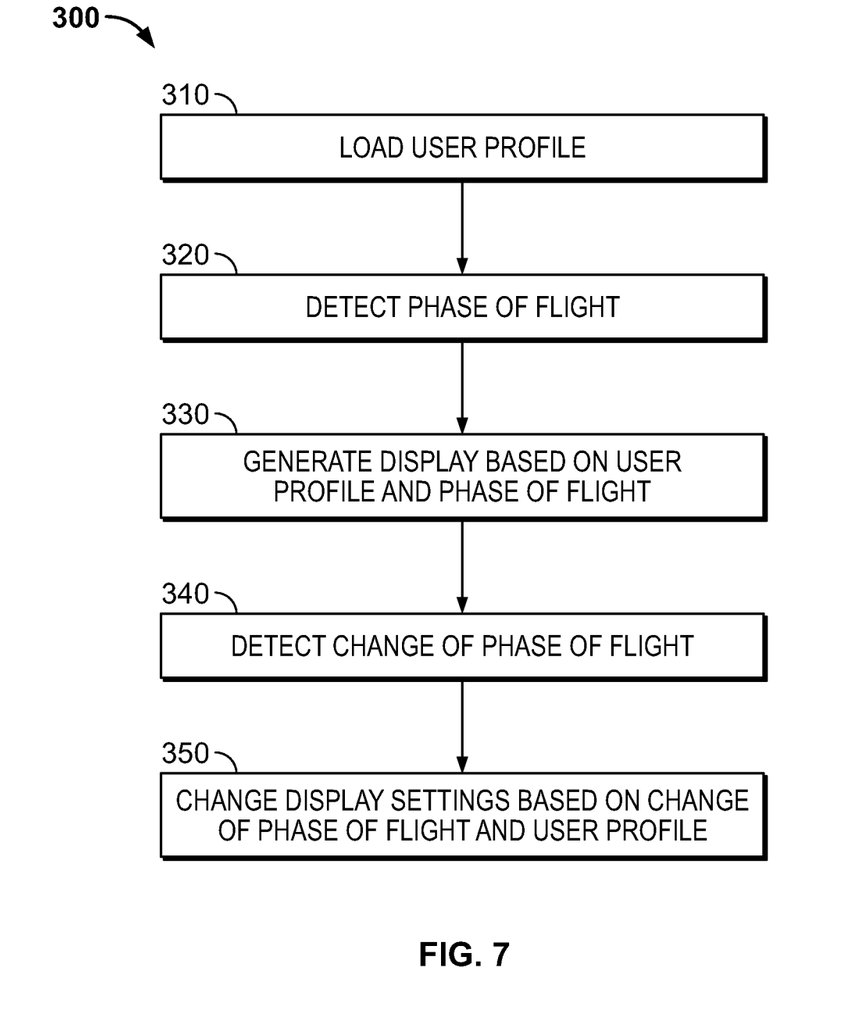
FIG. 7 is a flow chart of a method of generating a user and phase of flight dependent cockpit display, in accordance with embodiments of the present disclosure.

FIG. 6 is a process flow chart detailing a method 200 for defining a user profile and FIG. 7 is a process flow chart detailing a method 300 for generating a cockpit display based on the user profile. Methods 200, 300 are executed by the user profiled adjustable cockpit system 10 of FIG. 1. The methods may be implemented by distributed processors 56, 58, 60 across the on-board computer system 14, the user computer 34 and the cloud computer 40. The order of operation within the methods 200, 300 are not limited to the sequential execution as illustrated in the figures but may be performed in one or more varying orders as applicable and in accordance with the present disclosure. Steps of the methods 200, 300 are performed by the one or more processors 56, 58, 60 executing computer programming instructions (not shown).

In step 210, method 200 includes a step 210 of receiving a selection to create a new user profile or to edit an existing user profile. Step 210 may be performed off-board or on-board the aircraft 52 and may be performed using the user interface 38 of the user computer 34 or the user interface 24 of the on-board computer system 14. Often, step 210 will be performed off-board as part of a flight planning process on the user computer 34.

In step 220, a presentation is output on one of the display devices 32, 62 to display a presentation relating to user profile creation or editing. An exemplary such presentation is shown in FIG. 4A. In step 230, a selection of source of user profile is received. The selection is made through one of the user interfaces 24, 38. The source of user profile may be a default user profile or an existing user profile from the same user or from another user, which is stored in one or more of the databases of user profiles 22, 42, 50. The source of user profile may also be to customize a new user profile. When a default or existing user profile is selected, the user may have the option to adjust the user profile and save it as a different user profile or to overwrite the previous user profile if the user has the necessary permissions to edit.

In step 240, and assuming selection of an editing process of an existing user profile or a creation process of a new user profile, user defined display preferences are received. The user enters the user defined display preferences through one of the user interfaces 24, 38. The user defined display preferences include at least one or some preferences that are phase of flight dependent. In examples, the display preferences include user defined selections as to at least one of: presence of one or more map layers (which implicitly affects a level of declutter of the map), a scale of the lateral map, a level of declutter of the map and a size and/or aspect ratio of a vertical profile or VSD. Other cockpit environment features may also be set in the user profile.

In step 250, the user profile is saved to one of the databases of user profiles 22, 42, 50. In step 260, the user profile is transferred to the cockpit system 12 for execution during a flight. In one embodiment, the user profile is transferred from the local data of user profiles 50 on the user computer 34, which may an EFB device. The transfer may be over a local Wifi network of the aircraft 52, over a Bluetooth connection, over a wired connection or in any other way. The user may select, via one of the user interfaces 24, 38, which user profile to transfer. In another embodiment, the user profile is saved in association with a particular flight plan such that the user profile is automatically transferred upon loading of a flight plan to the cockpit system 12.

Referring to FIG. 7, a method 300 of generating a cockpit display based on the user profile is described. The method 300 (or at least part thereof) may be performed periodically throughout a flight and may be instigated prior to take-off.

In step 310, the user profile is loaded. That is, the user profile transferred to the on-board computer system 14 (and optionally stored in the on-board database of user profiles 22) is loaded (or at least the current display preferences are loaded) for implementation by the display computer 18. In step 320, a current phase of flight is detected in a number of ways including phase of flight information being supplied by the FMS 16. In step 330, the display computer 18 generates a cockpit display for output on the display device 32 (e.g. the navigation display 28) based on the user profile and the phase of flight. The generated display includes, in embodiments, a navigation map including various map layers at a first level of declutter, at a first lateral map range and with a first VSD format. The generated display is based on display preferences as to level of declutter, lateral map range and VSD format included in the user profile for the current phase of flight. In step 340 a change of phase of flight is detected. In step 350, the display settings are changed based on the changed phase of flight and the user profile. In embodiments, the generated display includes, in embodiments, a navigation map including various map layers at a second level of declutter, at a second lateral map range and/or with a second VSD format. The generated display is based on display preferences as to level of declutter, lateral map range and/or VSD format included in the user profile for the newly detected phase of flight. That is, at least one of these display preferences changes as a result of display preferences being defined in the user profile differently for the previous phase of flight than the current phase of flight. In some embodiments, a prompt is presented requesting a user to accept or reject the change of display preferences as shown in FIG. 5.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A cockpit display system, comprising:
   a display device;
   a user device;
   at least one processor in operable communication with the display device and the user device, the at least one processor configured to execute program instructions, wherein the program instructions are configured to cause the at least one processor to:
   generate a presentation of adjustable display settings on the display device, the presentation of adjustable display settings including a plurality of phase of flight elements and selected values for a range of a map for each of the plurality of phase of flight elements;
   receive user entry, via the user device, of values for the range of the map for different phases of flight;
   save the values for the range of the map in association with a respective one of a plurality of phases of flight in a user profile;
   retrieve the user profile, wherein the user profile includes user defined display settings profiles, and wherein each user defined display settings profile is associated with a respective phase of flight;
   retrieve phase of flight data;

select one of the user defined display settings profiles based on the phase of flight data;
generate a display for the display device using display settings included in the selected one of the user defined display settings profiles, wherein the display settings include
the saved values for the range of the map to be displayed, wherein the saved values are different for different phases of flight.

2. The cockpit display system of claim 1,
wherein the program instructions are further configured to cause the at least one processor to:
recognize a change of phase of flight based on the phase of flight data;
select another of the user defined display settings profiles based on the changed phase of flight; and
generate the display for the display device using display settings included in the selected another of the user defined display settings profiles.

3. The cockpit display system of claim 1, further comprising:
a cloud computing system including a cloud database of user profiles;
wherein the user device is configured to:
receive user entry, via the user device, of display settings for different phases of flight;
formulate the user profile based on the user entry of display settings; and
upload the user profile to the cloud computing system for storage in the cloud database of user profiles.

4. The cockpit display system of claim 3, wherein the cloud computing system is configured to lock user profiles in the database from editing and to require user credentials to be successfully authenticated for a user profile to be edited.

5. The cockpit display system of claim 3, wherein the user entry includes user entered display settings during a flight and a user entered command to save current display settings.

6. The cockpit display system of claim 3, wherein the user device is an electronic flight bag device or a personal electronic device.

7. The cockpit display system of claim 1, further comprising:
a user interface;
wherein the program instructions are configured to cause the at least one processor to:
determine a selection of a user profile based on input from the user interface;
set the user profile based on the user selection.

8. The cockpit display system of claim 7, wherein the user interface includes facial recognition technology or a wireless communications device.

9. The cockpit display system of claim 1,
wherein the user defined display settings profiles further include one or more of:
display settings as to preferences defining one or more layers of a map to be displayed; and
display settings as to preferences defining display of a vertical situational display (VSD).

10. The cockpit display system of claim 1,
wherein the user defined display settings profiles include:
display settings as to preferences defining at least one of:
map mode;
format of vertical situational display (VSD);
presence of VSD;
terrain display;
traffic display;
weather display;
geopolitical layer display;
aeronautical layer display;
sensor layer display;
VSD mode;
map range; and
airport features display.

11. The cockpit display system of claim 10, wherein the display settings are defined to differ with respect to phase of flight.

12. The cockpit display system of claim 1, wherein the generated display includes a navigation map.

13. The cockpit display system of claim 1,
wherein the program instructions are configured to cause the at least one processor to:
generate a prompt concerning a change in display settings due to change of phase of flight.

14. The cockpit display system of claim 1,
wherein the phase of flight includes at least two of:
departure;
oceanic/remote;
enroute;
approach;
arrival;
missed approach;
ground; and
airborne.

15. The cockpit display system of claim 1,
wherein the user profile includes cockpit features other than display settings; and
wherein the program instructions are configured to cause the at least one processor to:
set a cockpit feature other than display settings based on the user profile.

16. The cockpit display system of claim 14, wherein the cockpit feature includes at least one of:
cockpit display window configuration;
environmental settings including temperature and/or lighting;
seat adjustments;
input mode preference including voice, touch, gesture and/or camera;
automation mode selections;
active/enabled applications and functions; and
authentication preferences.

17. The cockpit display system of claim 1, wherein the phase of flight data is received from a flight management system (FMS).

18. A method of generating a cockpit display, the method comprising:
generating, via at least one processor, a presentation of adjustable display settings on the display device, the presentation of adjustable display settings including a plurality of phase of flight elements and selected values for a range of a map for each of the plurality of phase of flight elements;
receiving, via the at least one processor, user entry, via a user device, of values for the range of the map for different phases of flight;
saving, via the at least one processor, the values for the range of the map in association with a respective one of a plurality of phases of flight in a user profile;
retrieving, via the at least one processor, the user profile, wherein the user profile includes user defined display settings profiles, and wherein each user defined display settings profile is associated with a respective phase of flight;

retrieving, via the at least one processor, phase of flight data;

selecting, via the at least one processor, one of the user defined display settings profiles based on the phase of flight data;

generating, via the at least one processor, a display for a display device using display settings included in the selected one of the user defined display settings profiles, wherein the display settings include:

the saved values for the range of the map to be displayed, wherein the values for the range of the map are different for different phases of flight.

19. The method of claim 18, wherein:

the map is displayed at a first scale based on the values for the range of the map and includes a range ring indicating the first scale of the map; and the method comprises:

recognizing, via the at least one processor, a change of phase of flight based on the phase of flight data;

selecting, via the at least one processor, another of the user defined display settings profiles based on the changed phase of flight; and generating, via the at least one processor, the display of the map at a second scale based on the values for the range of the map and includes a range ring indicating the second scale of the map based on the selected another of the user defined display settings profiles.

20. A cockpit display system, comprising:

a display device;

a user device;

at least one processor in operable communication with the display device and the user device, the at least one processor configured to execute program instructions, wherein the program instructions are configured to cause the at least one processor to:

generate a presentation of adjustable display settings on the display device, the presentation of adjustable display settings including a plurality of phase of flight elements and options for a level of declutter of a map for each of the plurality of phase of flight elements, wherein the options define preferences for map layers including a terrain layer, a weather layer and a traffic layer;

receive user entry, via the user device, of selections for the level of declutter for the map for different phases of flight;

save the selections for the level of declutter of the map in association with a respective one of a plurality of phases of flight in a user profile;

retrieve the user profile, wherein the user profile includes user defined display settings profiles, and wherein each user defined display settings profile is associated with a respective phase of flight;

retrieve phase of flight data;

select one of the user defined display settings profiles based on the phase of flight data;

generate a display for the display device using display settings included in the selected one of the user defined display settings profiles, wherein the display settings include:

the saved selections for the level of declutter of a map to be displayed, wherein the level of declutter of the map is different for different phases of flight.

* * * * *